United States Patent
Antonini et al.

(10) Patent No.: US 9,463,443 B2
(45) Date of Patent: Oct. 11, 2016

(54) CATALYSTS SUPPORTS

(75) Inventors: Alejandro Martin Antonini, Stockton on Tees (GB); Richard John Mercer, Middlesbrough (GB); Adel Fay Neale, Middlesbrough (GB)

(73) Assignee: Johnson Matthey PLC, London (GB)

( * ) Notice: Subject to any disclaimer, the term of this patent is extended or adjusted under 35 U.S.C. 154(b) by 871 days.

(21) Appl. No.: 13/521,915

(22) PCT Filed: Jan. 13, 2011

(86) PCT No.: PCT/GB2011/050045
§ 371 (c)(1),
(2), (4) Date: Oct. 8, 2012

(87) PCT Pub. No.: WO2011/089411
PCT Pub. Date: Jul. 28, 2011

(65) Prior Publication Data
US 2013/0023593 A1 Jan. 24, 2013

(30) Foreign Application Priority Data
Jan. 22, 2010 (GB) .................................. 1000993.4

(51) Int. Cl.
B01J 21/00 (2006.01)
B01J 23/00 (2006.01)
B01J 25/00 (2006.01)
B01J 29/00 (2006.01)
B01J 23/89 (2006.01)
B01J 33/00 (2006.01)
B01J 37/02 (2006.01)
C10G 2/00 (2006.01)

(52) U.S. Cl.
CPC ............. *B01J 23/8913* (2013.01); *B01J 33/00* (2013.01); *B01J 37/0209* (2013.01); *B01J 37/0215* (2013.01); *C10G 2/33* (2013.01); *C10G 2300/1022* (2013.01)

(58) Field of Classification Search
USPC ....... 502/260, 263, 439, 100, 232, 240, 258; 518/715
See application file for complete search history.

(56) References Cited

U.S. PATENT DOCUMENTS

| | | | | |
|---|---|---|---|---|
| 2004/0186188 A1* | 9/2004 | Van Berge | ............. | C10G 2/332 518/716 |
| 2004/0242918 A1* | 12/2004 | Kadowaki | ................ | B01J 21/08 560/241 |
| 2008/0064770 A1* | 3/2008 | Rytter | ...................... | B01J 23/75 518/726 |
| 2008/0164443 A1* | 7/2008 | White | .................... | B01J 23/002 252/373 |
| 2008/0287556 A1* | 11/2008 | Bellussi | ................... | B01J 23/75 518/715 |
| 2009/0054224 A1* | 2/2009 | Casci | ....................... | B01J 23/75 502/64 |

FOREIGN PATENT DOCUMENTS

| WO | WO 99/42214 A1 | 8/1999 |
|---|---|---|
| WO | WO-2006/087522 A2 | 8/2006 |
| WO | WO-2007/009680 A1 | 1/2007 |
| WO | WO-2009/034046 A1 | 3/2009 |

OTHER PUBLICATIONS

Rawle et al., "Basic Principles of Particle Size Analysis," Technical Paper No. MRK034, Malvern Instruments Limited, 2001, pp. 1-8.
International Search Report dated Apr. 28, 2011, from PCT International Application No. PCT/GB2011/050045.
International Preliminary Report on Patentability dated Jul. 24, 2012, from PCT International Application No. PCT/GB2011/050045.

* cited by examiner

*Primary Examiner* — James McDonough
(74) *Attorney, Agent, or Firm* — RatnerPrestia

(57) ABSTRACT

A method for preparing a silica-modified catalyst support is described including:
(I) applying an alkyl silicate to the surface of a porous support material in an amount to produce a silica content of the silica-modified catalyst support, expressed as Si, in the range 0.25 to 15% by weight,
(ii) optionally drying the resulting silicate-modified support,
(iii) treating the support with water,
(iv) drying the resulting water-treated support, and
(v) calcining the dried material to form the silica-modified catalyst support.

22 Claims, No Drawings

CATALYSTS SUPPORTS

CROSS-REFERENCE TO RELATED APPLICATIONS

This application is the U.S. National Phase application of PCT International Application No. PCT/GB2011/050045, filed Jan. 13, 2011, and claims priority of British Patent Application No. 1000993.4, filed Jan. 22, 2010, the disclosures of both of which are incorporated herein by reference in their entireties for all purposes.

FIELD OF THE INVENTION

This invention relates to a method for the preparation of silica-modified catalyst supports and in particular catalyst supports suitable for preparing Fischer-Tropsch catalysts.

BACKGROUND OF THE INVENTION

Oxide materials such as aluminas, titanias, and zirconias are used as catalyst supports in a wide range of industrial processes, including the Fischer-Tropsch synthesis of hydrocarbons. The catalyst support provides a surface over which the catalytically active material is dispersed. The catalyst support may also confer other properties on the catalyst, such as its physical and chemical stability.

In order to adapt properties, such as solubility, it is known to coat support materials with silica. This may be done by applying a silicon compound to the surface of the support material, followed by drying and calcining to decompose the silicon compound and leave silica deposited as a coating on the catalyst support.

WO 99/42214 describes a method of treating a catalyst support comprising introducing onto and/or into an untreated catalyst support, which is partially soluble in an aqueous acid solution and/or a neutral aqueous solution, Si, Zr, Cu, Zn, Mn, Ba, Co, Ni and/or La as a modifying component. In the Examples, silica modified alumina and titania materials were made by adding alumina or titania to ethanol solutions of tetraethyl-orthosilicate (TEOS), holding the resulting mixture at 50-75° C. for one hour before drying under vacuum at 95° C. and calcining at 500° C. to decompose the silicon compound.

We have found a drawback of merely applying an alkyl silicate followed by drying and calcining, is that a considerable amount of the alkyl silicate, up to 50% in some cases, may be lost from the support during the process by evaporation. This results in equipment fouling and represents an inefficient waste of a valuable raw material, as well as resulting in an inconsistent product quality.

SUMMARY OF THE INVENTION

We have developed an improved treatment process in which >90% wt. of the silica derivable from the alkyl silicate is retained on the catalyst support.

Accordingly, the invention provides a method for preparing a silica-modified catalyst support comprising the steps of:
(i) applying an alkyl silicate to the surface of a porous support material in an amount to produce a silica content of the silica-modified catalyst support, expressed as Si, in the range 0.25 to 15% by weight,
(ii) optionally drying the resulting silicate-modified support,
(iii) treating the support with water,
(iv) drying the resulting water-treated support, and
(v) calcining the dried material to form the silica-modified catalyst support.

DETAILED DESCRIPTION OF THE INVENTION

Any catalyst support may be treated by the method of the present invention. The porous support preferably comprises alumina, titania, or zirconia. Silica may also be present. More preferably, the porous support comprises a transition alumina or hydrated alumina. The transition alumina may be of the gamma-alumina group, for example an eta-alumina or chi-alumina. These materials may be formed by calcination of aluminium hydroxides at 400 to 750° C. and generally have a BET surface area in the range 150 to 400 $m^2/g$. Alternatively, the transition alumina may be of the delta-alumina group, which includes the high temperature forms such as delta- and theta-aluminas that may be formed by heating a gamma group alumina to a temperature above about 800° C. The delta-group aluminas generally have a BET surface area in the range 50 to 150 $m^2/g$. The transition alumina preferably comprises gamma alumina and/or a delta alumina with a BET surface area in the range 120-250 $m^2/g$.

The support material should be of suitable purity for use as a catalyst support. In particular, in Fischer-Tropsch catalysts, the level of alkali metal, notably sodium, in the support is desirably <100 ppm, more preferably <50 ppm.

The porous support may be in any form used as a catalyst support. For example, the porous support may be a spray-dried powder, or in the form of a pellet, extrudate, or granule, or a honeycomb or other monolithic structure. A suitable powder catalyst support generally has a volume-median diameter D[v,0.5] in the range 1 to 200 µm. In certain applications, such as for catalysts intended for use in slurry reactions, it is advantageous to use particles which have a volume-median diameter D[v,0.5] in the range from 25-150 µm. For other applications, e.g. as a catalyst for reactions carried out in a fluidised bed, it may be desirable to use larger particle sizes, preferably with D[v,0.5] in the range 25 to 1000 µm or larger. The term volume-median diameter D[v,0.5], sometimes given as $D_{50}$ or $D_{0.5}$, is defined by Dr. Alan Rawle in the paper "Basic Principles of Particle Size Analysis" available from Malvern Instruments Ltd, Malvern, UK (see www.malvern.co.uk), and is calculated from the particle size analysis which may conveniently be effected by laser diffraction, for example using a "Malvern Mastersizer." Pellets, extrudates or granules, which may be used in fixed bed arrangements, typically have a particle size, usually expressed as the width or diameter, in the range 1 to 25 mm and an aspect ratio (i.e. length/width) of <10.

The pore volume of the support is preferably relatively high in order to achieve high catalyst loadings. The pore volume is preferably above 0.25 $cm^3/g$, more preferably in the range 0.30 to 0.75 $cm^3/g$, and may be determined by nitrogen physisorption using known techniques. It is preferred that the support has a relatively large average pore diameter, as the use of such supports may give Fischer-Tropsch catalysts of particularly good selectivity. Preferred supports have an average pore diameter (APD) of at least 10 nm, particularly in the range 12 to 20 nm. [By the term average pore diameter, we mean 4 times the pore volume as measured from the adsorption branch of the nitrogen physisorption isotherm at 0.99 relative pressure divided by the BET surface area].

In order that the alkyl silicate may better react with the surfaces of the porous support, the surfaces of the porous support are preferably pre-activated prior to application of the alkyl silicate by treating the porous support with an acidic wash solution and drying the acid-washed support. The acid may be an inorganic acid, such as nitric acid, or an organic acid, such as citric or malonic acid. Aqueous wash solutions are preferred. Aqueous nitric acid is preferred as it additionally removes alkaline contaminants that may be present in the support. Following the acid wash, it is not necessary to water-wash the support, which may simply be filtered if necessary and dried at 30-150° C.

The alkyl silicate may be any suitable alkyl silicate, i.e. one normally liquid at room temperature and having one or more alkyl silicate (Si—O—R) groups. Thus, silanes having one, two, or three Si—OR groups may be used, although this is less preferred, as they can be less reactive with the support material. Preferably, the alkyl silicate is a tetra-alkyl silicate, more preferably a tetra-alkyl silicate of formula $Si(OR)_4$, where R is a C1-C4 alkyl group. The alkyl groups may be linear or branched and functionalized or unfunctionalized. A particularly preferred alkyl silicate is tetraethyl-orthosilicate (TEOS).

The amount of silica that may be deposited according to the present method in a single application of alkyl silicate is higher than previous methods due to the water-treatment stage. While silica in amounts up to 32% wt. (about 15% wt. Si) may be applied, the silica content of the silica-modified catalyst support, expressed as Si, is preferably in the range 1 to 10% Si by weight, more preferably in the range 1-5% wt. Si. In this way the properties conferred by the silica coating may be achieved without excessive silica blocking pores in the catalyst support.

Whereas the liquid alkyl silicate may be applied neat, it is preferred that the alkyl silicate is applied as a solution in an alcohol, more preferably the alcohol corresponding to that in the alkyl silicate. Thus, ethanol is a preferred solvent for TEOS. This is because in the presence of other alcohols, some alkoxide exchange may occur, which potentially changes the reactivity of the silicon compound toward the support material.

Unlike the method of the aforesaid WO 99/42214 in a preferred embodiment, the volume of the alkyl silicate solution is less than or equal to the pore volume of the porous support material. By using this so-called "incipient wetness" method, the silica is primarily deposited within the pores of the support material. It also reduces the amount of liquid to be removed in drying and makes a separate filtration step unnecessary.

The silicate-modified support may be treated with water directly or may first be dried. Drying encourages the reaction of the alkyl silicate with the surface of the catalyst support, but is desirably performed under conditions that minimize the volatilization of the alkyl silicate. The silicate-modified support is preferably dried at a temperature in the range 30-150° C. prior to treatment with water. At this stage, drying at atmospheric pressure is sufficient and vacuum drying is not necessary, but it may be used, if desired, as described below. Drying times may vary depending on the support, but typically may be in the range 0.5 to 8 hours.

The water treatment step used in the current invention forces the hydrolysis of the alkyl silicate on the support causing it to cross-link, thereby increasing its molecular mass and reducing its volatility. Complete hydrolysis of a tetra-alkyl silicate yields 4 moles of alcohol per Si atom to leave hydrous silica deposited on the catalyst support. Whereas steam treatment of the support may be carried out to force the hydrolysis, preferably the water treatment comprises applying a volume of liquid water to the support. Whereas the silicate-modified support may be immersed or slurried in water, in a preferred embodiment, where the silicate-modified support is dried, the volume of water is desirably equal to or less than the pore volume of the dried silicate-modified support. This again reduces the amount of liquid to be removed in the subsequent drying step and removes the need for a separate filtration step.

The water-treated support is dried to remove water and alcohol evolved from the alkyl silicate. Drying may be performed at atmospheric pressure or, optionally, at least part of the drying step may be performed under vacuum, which may be in the range 1-10 mm Hg. Preferably, if vacuum drying is employed, the water-treated support is dried for a period at ambient pressure before being dried under vacuum. Thus in a preferred embodiment the water-treated support is dried for a first period at ambient pressure and then a second period under vacuum. The water treated support may be dried at a temperature in the range 30-150° C. Drying times may vary depending on the support and whether vacuum drying is employed, but the drying step or steps may be in the range 0.5 to 8 hours.

The dried material is then calcined to anchor the cross-linked silica to the support. Preferably the calcination step is performed by heating the dried support to a temperature in the range 500-950° C., preferably 820-900° C., for between 0.5 and 8 hours.

We have found that using the method of the present invention, the silica content of the calcined catalyst support may be ≥90% wt. of that derivable from the amount of alkyl silicate applied to the porous support. Examples of retention of ≥95% wt. of the Si have been obtained.

The silica-modified catalyst supports may be used to prepare a range of catalyst materials comprising a catalytically active material on the silica-modified catalyst support. Accordingly, the invention further provides a method of preparing a catalyst comprising the step of applying a catalytically active material to the silica-modified catalyst support prepared as described herein.

The catalysts may be prepared according to methods known to those skilled in the art for example by impregnation techniques whereby the catalytically active metal, e.g. Co, Cu, Ni, Fe, Cr, Mo, Ti, Mn, Zn, Pt, Pd, Ru, or Re, is deposited onto or within the modified support. Such catalysts may find use in a wide range of industrial applications, such as hydrocarbon purification, hydrodesulphurisation, reforming, water-gas shift reactions, methanol and ammonia synthesis, hydrogenation of oils and fats, polymerization of olefins, and the Fischer-Tropsch synthesis of hydrocarbons. The oxides may also be used to 'heterogenize' homogeneous catalysts, for example in organic synthesis such as asymmetric hydrogenation reactions.

Preferably, the catalysts are cobalt-containing catalysts, including promoted cobalt catalysts. Particularly preferred catalysts comprise Co in an amount in the range 15-30% by weight. Precious metal promoters selected from one or more of Pt, Pd, Ru, and Re may also be included in amounts in the range 0.01-1.0%, preferably 0.01 to 0.50% by weight. Cobalt catalysts prepared on the supports prepared according to the present invention may have cobalt surface areas (as determined by hydrogen chemisorption at 150° C. following reduction at 425° C.) of ≥8 $m^2/g$ catalyst (typically ≥50 $m^2/g$ Co). In addition, the Co catalysts may have an attrition weight loss (as determined by ASTM D5757-00) of ≤5.0% wt., preferably ≤2.0% wt. Such catalysts are particularly useful in the Fischer-Tropsch synthesis of hydrocarbons. Accordingly, the invention further provides a process for the Fischer-Tropsch synthesis of hydrocarbons comprising contacting a gas mixture containing hydrogen and carbon monoxide over a cobalt-catalyst comprising a support prepared as described herein.

The Fischer-Tropsch synthesis of hydrocarbons with cobalt catalysts is well established. The Fischer-Tropsch synthesis converts a mixture of carbon monoxide and hydrogen to hydrocarbons. The mixture of carbon monoxide and hydrogen is typically a synthesis gas having a hydrogen:carbon monoxide ratio in the range 1.6-3.0:1, preferably 1.7-2.5:1. The reaction may be performed in a continuous or batch process using one or more fixed bed reactors, stirred slurry-phase reactors, jet-loop reactors, bubble-column reactors, or fluidised bed reactors. The process may be operated at pressures in the range 0.1-10 MPa and temperatures in the range 150-350° C., preferably 200-250° C. The gas-hourly-space velocity (GHSV) for continuous operation is in the range 100-25000 $hr^{-1}$. A preferred operating range is 1000-15000 $hr^{-1}$. Cobalt catalysts prepared on the supports prepared according to the present invention are capable of providing C5+ hydrocarbons at >200 g/kg catalyst per hour at a selectivity of >75% molar carbon under standard operating conditions.

EXAMPLES

The invention is further illustrated by reference to the following examples. BET surface areas and pore volumes were measured using well-known nitrogen adsorption techniques. The Si and metal levels were measured using ICP-optical emission spectroscopy. Attrition resistances were determined by an air-jet method and are quoted as attrition loss wt % (according to ASTM D5757).

Example 1

Preparation of Silica Modified Support a) Acid Wash. 350 g of spray dried transition alumina powder was slurried in 1.0 $dm^3$ of 0.5 M nitric acid for 30 minutes at ambient temperature. The resultant acid washed alumina was separated from the nitric acid solution using a Büchner filter. The acid washed alumina was dried at 105° C. for 3 hours.

b) Silica Modification. 150 g of acid washed and dried alumina with a water pore volume of 0.54 $cm^3/g$ was placed in a 500 ml round bottomed flask connected to a rotary evaporator. A solution of TEOS (tetraethyl-orthosilicate, $Si(OCH_2CH_3)_4$) in absolute ethanol (31.9 g TEOS, 33.8 g ethanol) was added to the acid washed alumina in five aliquots, with rotational mixing between additions, to 95% v/v incipient wetness. Once all of the TEOS solution had been added to the acid washed alumina, mixing was continued until a homogeneous free flowing powder was achieved (5-10 minutes). The round bottomed flask was then lowered into a pre-heated oil bath at 105° C. and dried with rotation for one hour at ambient pressure. The resultant dried powder had a water pore volume of 0.33 $cm^3/g$. De-mineralized water was added to 142 g of the dried powder in a round bottomed flask connected to a rotary evaporator in three aliquots to 100% v/v incipient wetness (47 $cm^3$). The sample was mixed via rotation to ensure the powder remained homogeneous and free flowing during water addition. After water addition was complete the powder was mixed for a further 5-10 minutes. The powder was then dried at 105° C. and ambient pressure until collection of condensate stopped (after ca. 20 minutes). Vacuum (5 mm Hg) was then applied and the powder was dried under vacuum for a further 15 minutes. The vacuum-dried powder was transferred from the rotary evaporator to a calcination tray. The powder was calcined at 750° C. for 2 hours. The ramp rate from ambient temperature was 2° C./minute, with a 1 hour hold at 120° C.

Any suitable calciner such as a rotary calciner can be used as an alternative to tray calcination. Suitable conditions are a ramp to calcination hold temperature at 25° C./minute, a hold temperature >720° C., and a hold time >30 min.

Example 2

Catalyst Preparation

To prepare a 20% w/w Co, 0.05% w/w Pt Fischer-Tropsch catalyst, 300 g of the calcined silica modified alumina support of Example 1 was placed in a pre-heated Z Blade Mixer at 60-70° C. The powder was left to warm with mixing for 15 minutes. To this powder was added (with mixing) 379 g of molten cobalt nitrate hexahydrate (19.8% w/w Co) and 5.6 g of tetraammineplatinum (II) nitrate solution (3.37% w/w Pt). Mixing was continued for 10 minutes after liquid addition was complete. The impregnated powder was dried at 110° C. for 3 hours and calcined at 280° C. for two hours to produce a catalyst precursor.

The properties of the support, acid-washed support, calcined silica-modified support and catalyst precursor are given in Table 1.

TABLE 1

| Parameter | Parent Alumina | Acid Washed Alumina | Calcined $SiO_2$ Modified Alumina | FT Catalyst precursor |
|---|---|---|---|---|
| BET surface area ($m^2/g$) | 187 | 207 | 185 | 128 |
| $N_2$ pore volume ($cm^3/g$) | 0.57 | 0.54 | 0.52 | 0.32 |
| Cobalt surface area ($m^2/g$) | | | | 12 |
| $D_{50}$ (μm) | 77 | 90 | 84 | 82 |
| Air Jet Attrition (% w/w) | 7.2 | 7.3 | 4.3 | 1.7 |
| LOC (500° C.) | 0.4 | 27.1 | 0.5 | 3.5 |
| Si (% w/w) | | | 3.67 | 2.73 |
| Co (% w/w) | | | | 18.0 |
| Pt (% w/w) | | | | 0.043 |
| Na (ppm w/w) | 98 | 41 | | |

The acid washing step reduced the sodium content of the support from 98 ppm w/w to 41 ppm w/w (loss free basis). There was also a significant increase in loss on calcination and BET surface area.

The TEOS modification/hydrolysis/calcination sequence resulted in a material with similar BET surface area and pore volume to the starting material but with significantly lower air jet attrition (ASTM D 5757-00). The 750° C. calcination step reduced the residual weight loss-on-calcination (LOC) to 0.5% w/w.

The measured silicon (Si) content of the calcined $SiO_2/Al_2O_3$ support is 3.67% w/w (loss free). The calculated loss free silicon content is:
Weight of TEOS=31.9 g
Moles of TEOS=31.9/208.33 mol
Weight of Si=(31.9/208.33)×28.09=4.30 g
Weight of $SiO_2$=(31.9/208.33)×60.08=9.20 g
Loss free weight of alumina=150×(100−27.1)/100=109.35 g
Loss free Si content=(4.30×100)/(9.20+109.35)=3.63% w/w Hence the method provides quantitative retention of the silicon added to the alumina as TEOS.

Example 3

Catalyst Preparation without Acid Pre-Wash

The catalyst preparation method described in Example 2 was performed on a silica-modified alumina prepared according to Example 1, but without the nitric acid pre-wash step. The air jet attrition of the catalyst precursor sample prepared on the alumina support with omission of the acid washing step was 3.1% w/w (ASTM D 5757-00).

Comparative Example

The catalyst preparation method described in Example 2 was performed on an untreated, un-modified alumina (i.e. the parent alumina). The air jet attrition of the catalyst precursor sample prepared on the alumina support with no pre-treatment was 5.5% w/w (ASTM D 5757-00).

Example 4

Fischer-Tropsch Testing

The catalyst precursor of Example 2 was used for the Fischer-Tropsch synthesis of hydrocarbons in a laboratory-scale tubular reactor. About 0.4 g of catalyst precursor, mixed with SiC powder, was placed in tubular reactor (ca. 4 mm ID by 50 mm depth) and reduced by passing pure hydrogen through the tube at 60 ml/minute (GHSV=9000 l/kg catalyst/hour) while heating from room temperature to 380° C. at 3 degrees C/minute, followed by holding at this temperature under the hydrogen flow for 7 hours. Following the reduction step, the sample was cooled to 100° C., the flow changed to a synthesis gas and the pressure increased to 20 barg. The temperature was then increased at 1° C./min to 230° C. and the Fischer-Tropsch reaction monitored over 100 hrs. The synthesis gas was a hydrogen/carbon monoxide/argon mixture, with a $H_2$:CO ratio=2:1, fed initially at $H_2$:CO:Ar flow of 40:20:4 ml/minute (GHSV=9600 l/kg catalyst/hour) for the first 24 hours, and then $H_2$:CO:Ar=50: 25:5 ml/minute (GHSV=12000 l/kg catalyst/hour) to bring CO conversion to approximately 60%. The activity and selectivity of the catalyst to $CH_4$, C2-C4, and C5+ hydrocarbons were measured using known Gas Chromatography (GC) techniques. The results at 20 hrs and 100 hrs for the catalyst are given in Table 2.

TABLE 2

| Time | $H_2$/CO GHSV (l/kg catalyst/hour) | CO conversion (%) | $CO_2$ (%) | $CH_4$ (%) | C2-C4 (%) | C5+ (%) |
|---|---|---|---|---|---|---|
| 20 hrs | 9000 | 78.38 | 0.81 | 10.74 | 9.32 | 79.13 |
| 100 hrs | 11250 | 60.09 | 0.42 | 11.81 | 9.27 | 78.50 |

The results show that an effective catalyst having improved attrition resistance may be prepared using the method of the present invention.

Example 5

Variation of Silicon Content and Calcination Temperature in Silica Modified Support The preparation method described in Example 1 was repeated with variation of the weight of TEOS added and the calcination temperature applied. The properties of the resultant catalyst supports, termed supports A-D, are given in Table 3.

TABLE 3

| Parameter | Support A | Support B | Support C | Support D |
|---|---|---|---|---|
| Calcination temperature (° C.) | 750 | 750 | 825 | 950 |
| Silicon content (% w/w) | 3.45 | 1.27 | 3.72 | 3.94 |
| Sodium content (ppm w/w) | 45 | 42 | 40 | 43 |
| BET surface area ($m^2$/g) | 184 | 186 | 171 | 192 |
| Nitrogen pore volume ($cm^3$/g) | 0.51 | 0.56 | 0.50 | 0.61 |
| $D_{50}$ (μm) | 77 | 80 | 72 | 78 |
| Air jet attrition (% w/w) | 4.5 | 5.9 | 4.4 | 4.3 |

These supports were converted into platinum promoted cobalt Fischer-Tropsch catalysts according to the method described in Example 2. Analytical data for catalyst oxides derived from Supports A, B, and C (respectively Catalysts A, B, and C) are given in Table 4.

TABLE 4

| Sample | BET SA ($m^2$/g) | $N_2$ PV ($cm^3$/g) | Co SA ($m^2$/g) | Attrition (% w/w) |
|---|---|---|---|---|
| Catalyst A | 133 | 0.33 | 12 | 2.0 |
| Catalyst B | 134 | 0.36 | 12 | 4.5 |
| Catalyst C | 130 | 0.31 | 11 | 0.7 |

Catalysts A, B, and C were tested according to the method described in Example 4. Resultant Fischer-Tropsch performance data are given in Table 5.

TABLE 5

| Sample | Time (hours) | $H_2$/CO GHSV (l/kg cat/hour) | CO conversion (%) | $CO_2$ (%) | $CH_4$ (%) | $C_2$-$C_4$ (%) | $C_{5+}$ (%) |
|---|---|---|---|---|---|---|---|
| Catalyst A | 20 | 9000 | 75.32 | 0.68 | 9.86 | 8.46 | 81.00 |
| Catalyst A | 100 | 11250 | 58.24 | 0.41 | 11.18 | 9.85 | 78.56 |
| Catalyst B | 20 | 9000 | 67.80 | 0.37 | 8.21 | 7.03 | 84.39 |
| Catalyst B | 100 | 11250 | 48.82 | 0.23 | 9.66 | 7.71 | 82.40 |
| Catalyst C | 20 | 9000 | 74.43 | 0.41 | 9.49 | 7.06 | 83.04 |
| Catalyst C | 100 | 11250 | 52.79 | 0.24 | 10.98 | 8.48 | 80.30 |

The invention claimed is:

1. A method for preparing a silica-modified catalyst support comprising:
    (i) applying an alkyl silicate of formula $Si(OR)_4$, where R is a C1-C4 alkyl group to the surface of a porous support material in an amount to produce a silica content of the silica-modified catalyst support, expressed as Si, in the range 0.25 to 15 % by weight,
    (ii) drying the resulting silicate-modified support,
    (iii) treating the silicate-modified support with water to force hydrolysis of the alkyl silicate on the support and to cause cross-linking to form a silicate material having a greater molecular mass and reduced volatility than the alkyl silicate,
    (iv) drying the resulting water-treated support, and
    (v) calcining the dried material to form the silica-modified catalyst support.

2. A method according to claim 1, wherein the porous support comprises alumina, titania, or zirconia.

3. A method according to claim 1, wherein the porous support comprises a transition alumina or hydrated alumina.

4. A method according to claim 1, wherein the porous support is a spray-dried powder with an average particle size in the range 1 to 200 micrometres.

5. A method according to claim 1, wherein the porous support is a pellet, extrudate, or granule with a particle size in the range 1 to 25 mm.

6. A method according to claim 1, wherein the surfaces of the porous support are pre-activated prior to application of the alkyl silicate by treating the porous support with an acidic wash solution and drying the acid-washed support.

7. A method according to claim 1, wherein the alkyl silicate is tetraethyl-orthosilicate (TEOS).

8. A method according to claim 1, wherein the silica content of the silica-modified catalyst support, expressed as Si, is in the range 1 to 10% by weight.

9. A method according to claim 1, wherein the alkyl silicate is applied as a solution in an alcohol.

10. A method according to claim 9, wherein the volume of the alkyl silicate solution is less than or equal to the pore volume of the porous support material.

11. A method according to claim 1, wherein the silicate-modified support is dried at a temperature in the range 30-150° C. prior to the treatment with water.

12. A method according to claim 1, wherein the water treatment comprises immersing or slurrying the silicate-modified support in water.

13. A method according to claim 11, wherein the water treatment comprises applying a volume of liquid water to the dried silicate-modified support, said volume of water being equal to or less than the pore volume of the dried silicate-modified support.

14. A method according to claim 1, wherein the water-treated support is dried for a period at ambient pressure or under vacuum.

15. A method according to claim 1, wherein the water treated support is dried at a temperature in the range 30-150° C.

16. A method according to claim 1, wherein the water-treated support is dried under a vacuum of 1-10 mm Hg.

17. A method according to claim 1, wherein the calcination step is performed by heating the dried support to a temperature in the range 500-950° C. for between 0.5 and 8 hours.

18. A method according to claim 1, wherein the silica content of the calcined catalyst support is ≥90% wt of that derivable from the amount of alkyl silicate applied to the porous support.

19. A method of preparing a catalyst comprising the step of applying a catalytically active material to a silica-modified catalyst support prepared according to the method of claim 1.

20. A method according to claim 19, wherein the catalytically active material comprises cobalt.

21. A method according to claim 1, wherein the water-treated support is dried for a first period at ambient pressure and then a second period under vacuum.

22. A method according to claim 1, wherein the calcination step is performed by heating the dried support to a temperature in the range 820-900° C., for between 0.5 and 8 hours.

* * * * *